(12) United States Patent
Thistleton et al.

(10) Patent No.: US 6,889,575 B2
(45) Date of Patent: May 10, 2005

(54) MOTOR VEHICLE BRAKE OR CLUTCH PEDAL

(75) Inventors: John Stuart Thistleton, Southrey (GB); Christopher Andrew Jagger, Wakefield (GB); Andrew John Downie, Scunthorpe (GB); Lee Mark Routledge, Scunthorpe (GB)

(73) Assignee: BCK Technology Limited (GB)

( * ) Notice: Subject to any disclaimer, the term of this patent is extended or adjusted under 35 U.S.C. 154(b) by 179 days.

(21) Appl. No.: 10/202,948

(22) Filed: Jul. 25, 2002

(65) Prior Publication Data

US 2003/0019320 A1 Jan. 30, 2003

(30) Foreign Application Priority Data

Jul. 26, 2001  (GB) .............................................. 0118227

(51) Int. Cl.⁷ ................................................. C05G 1/14
(52) U.S. Cl. ........................................................ 74/512
(58) Field of Search ........................... 74/512, 513, 560

(56) References Cited

U.S. PATENT DOCUMENTS

| 3,807,253 | A | * | 4/1974 | Belzile et al. ................. 74/512 |
| 6,176,340 | B1 | * | 1/2001 | Mizuma et al. ............. 180/274 |
| 6,279,417 | B1 | * | 8/2001 | Mizuma et al. ................. 74/512 |
| 6,364,046 | B1 | * | 4/2002 | Forssell et al. ............. 180/275 |
| 6,571,659 | B2 | * | 6/2003 | Choi ............................ 74/512 |
| 6,571,900 | B2 | * | 6/2003 | Thistleton ................... 180/274 |
| 2004/0020324 | A1 | * | 2/2004 | Jemmeson et al. ........... 74/512 |

FOREIGN PATENT DOCUMENTS

| EP | 0928727 | 7/1999 |
| JP | 11059350 | 3/1999 |

OTHER PUBLICATIONS

Partial Eurpean Search Report dated Apr. 20, 2004 which issued in connection with a corresponding European application.

* cited by examiner

*Primary Examiner*—David A. Bucci
*Assistant Examiner*—Vicky A. Johnson
(74) *Attorney, Agent, or Firm*—Trexler, Bushnell, Giangiorgi, Blackstone & Marr, Ltd.

(57) ABSTRACT

A motor vehicle brake or clutch pedal comprising a two part blade with a first blade part (1) adapted at one end to carry a foot pad, and a second blade part (2) adapted to be connected to a push rod of an operating mechanism of either a brake booster or a clutch, with means to disconnect, or to render ineffective, the connection between the second blade part (2) and the push rod in a frontal crash situation of sufficient magnitude. The invention also includes a motor vehicle incorporating at least one such pedal.

4 Claims, 7 Drawing Sheets

MOTOR VEHICLE BRAKE OR CLUTCH PEDAL

RELATED/PRIORITY APPLICATION

This application claims priority with respect to British Application No. 0118227.8, filed Jul. 26, 2001.

FIELD OF THE INVENTION

This invention relates to a motor vehicle brake or clutch pedal which provides for automatic de-coupling of the pedal from an operating rod in a crash situation of sufficient magnitude.

BACKGROUND OF THE INVENTION

With a view to reducing or eliminating the possibility of foot or lower limb injuries to the driver particularly by the brake pedal, and to a lesser extent the clutch pedal (if present), during a crash situation and particularly a frontal crash situation in which the pedal(s) is/are forced rearwardly into the passenger compartment and/or the driver is forced forwardly towards the engine compartment, there have been various proposals for automatically displacing the pedal(s) to a minimal injury position, or alternatively for de-coupling the pedal(s) from a conventionally-provided push rod of a brake booster, or a clutch operating mechanism.

OBJECT OF THE INVENTION

A basic object of the invention is the provision of an improved motor vehicle brake or clutch pedal.

SUMMARY OF A FIRST ASPECT OF THE INVENTION

According to a first aspect of the present invention there is provided a motor vehicle brake or clutch pedal comprising a two part blade with a first blade part adapted at one end to carry a foot pad, and a second blade part attached to the first blade part and adapted to be connected to a push rod of either a brake booster or a clutch operating mechanism, with means to disconnect, or to render ineffective, an interconnection between the second blade part and the push rod in a frontal crash situation of sufficient magnitude.

SUMMARY OF A SECOND ASPECT OF THE INVENTION

According to a second aspect of the invention, there is provided a motor vehicle incorporating at least one pedal in accordance with the first aspect.

PREFERRED OR OPTIONAL FEATURES

The means to disconnect, or to render ineffective, the connection between the second blade part and the push rod is a release lever that is pivotally attached to one of the blade parts and adapted, in a frontal crash situation of sufficient magnitude, to abut a portion of the vehicle designed for minimal deformation, eg a car cross beam, and thereby be rotated to a release position.

The first and second blade parts are mounted for rotation about a common pivot axis.

The first blade part is latched to the second blade part for normal operation, being unlatched upon rotation of the release lever to the release position.

The second blade part is located to at least one lateral side of the first blade part.

The second blade part is constructed from two components consisting of a first component that is pivotably attachable to the push rod of either a conventionally-provided brake booster or of a clutch mechanism, that is pivotably attached, at one end, to the first blade part, and that at its other end forms an engageable and disengageable connection with one end of the second component which at its other end is mountable for rotation about a pivot axis.

The release lever is pivotably attached to the first blade part in such a position that, in normal operation, rotation of the second component of the second blade part is precluded by the release lever, thereby preventing disengagement of the connection, but in a frontal crash situation of sufficient magnitude, is rotated to a position that permits rotation of the second component, thereby disengaging the connection, thereby freeing the pedal.

The second component is cranked, so that the release lever is interposed between the (pivoted) end of the first blade part and the second component of the second blade part.

The engageable and disengageable connection comprises a male tongue eg on the one component, engaging a female groove of the other component, such that the second blade part is rendered rigid during normal operation.

In another embodiment, the second blade part is located to at least one lateral side of the first blade part and is pivotably attached to an operating rod of a conventionally-provided brake booster or of a clutch mechanism, and is also pivotably attached, at one end, via a breakable joint, to the first blade part, whilst its other end is mounted for co-axial rotation about the pedal pivot axis, and a release member attachable, in use, to a component of the vehicle intended to deform in a frontal crash situation of sufficient magnitude, and insertable between the first and second blade parts to break the joint and thereby the attachment between the first and second blade parts, thereby freeing the pedal.

The second blade part is cranked, to provide a gap into which the release member is forced in a frontal crash situation of sufficient magnitude.

The breakable joint comprises a pin.

The pin is carried by the first blade part and projects laterally therefrom to engage a circular receiving hole provided in one end of the second blade part.

In yet another embodiment, the first blade part is of "U" section having spaced-apart side cheeks between which is housed the second blade part, the two blade parts being attached to one another by a pin or rivet.

The release lever comprises a slot having a narrow throat portion extending to an enlarged portion.

DETAILED DESCRIPTION OF THE DRAWINGS

The invention will now be described in greater detail, by way of three examples, with reference to the accompanying drawings, in which.

In all drawings, like reference numerals are used for like components, and the pedal is referred to as a brake pedal.

Figure 1:
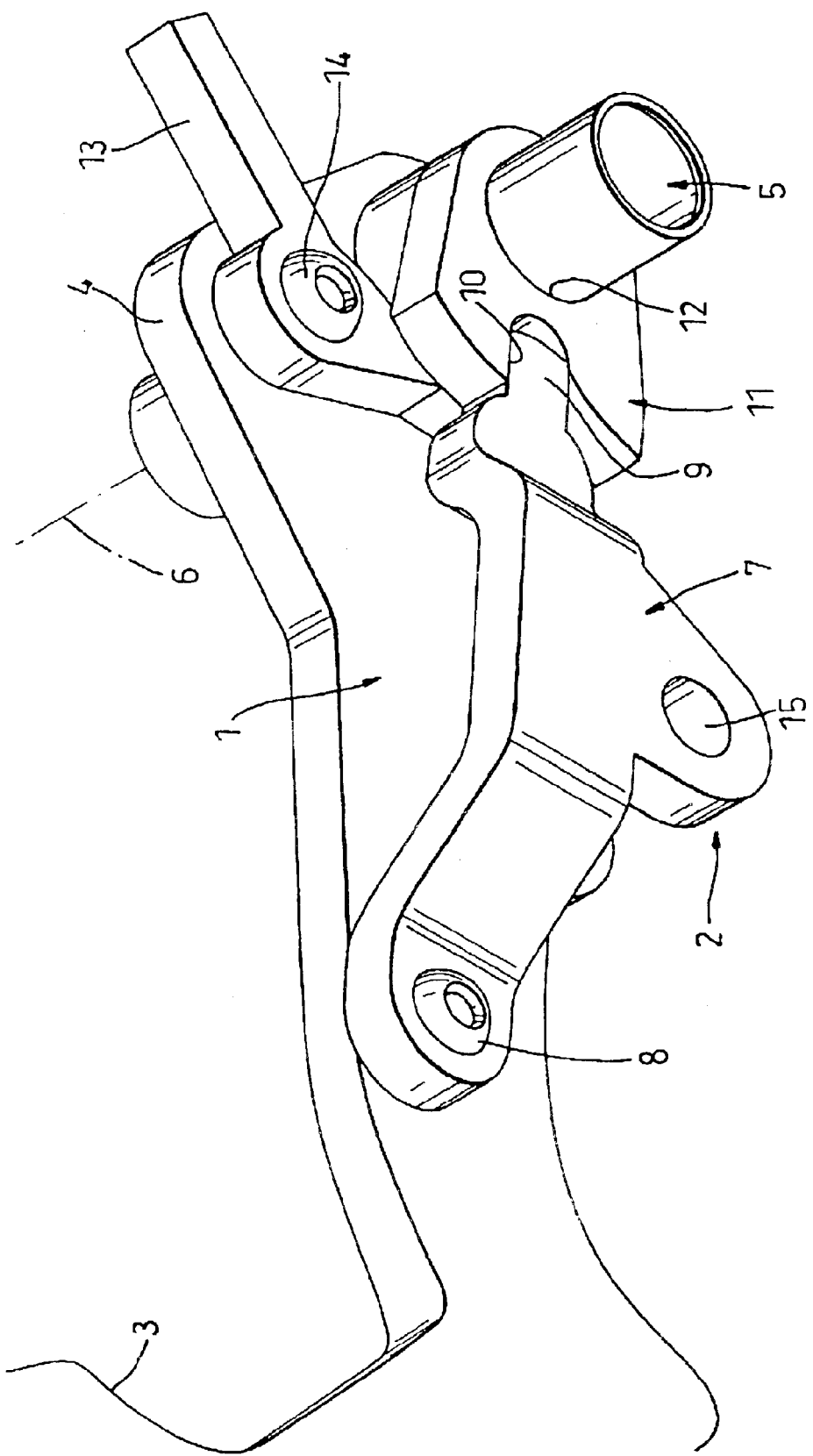
FIG. 1 is a perspective view of the first embodiment.

In FIG. 1, a brake blade is of two part construction viz a first blade part 1, and a second blade part 2 located to one lateral side of the blade part 1. The first blade part 1 is provided at one end 3 with a foot pad (not shown) and at the other end 4 is provided with a circular hole by means of which it is fitted onto a tubular brake hub 5 for rotation about axis 6.

The second blade part 2 is constructed from two components, being a first component 7 secured at one end by a rivet 8 to the first blade part 1, and provided at its other end with a tongue 9 to engage a groove 10 of second component 11 which is also provided with a circular hole 12 for rotational mounting on the hub 5.

The first component 7 is cranked away from the first blade part 1 to provide a gap for location of a release lever 13 secured by a rivet 14 to the first blade part 1. The first component 7 is also provided with a circular hole 15 for pivotal connection to one end of a push rod (not shown) eg of a conventional brake booster.

During normal operation, the interaction of release lever 13, first component 7 and second component 11 maintains pedal position and loading.

During a frontal crash situation of sufficient magnitude, the release lever 13 is rotated about rivet 14 clear of the second component 11, allowing the first component 7 to rotate about rivet 8 and to disengage tongue 9 from groove 10 from 2 as it rotates around hub 5, allowing the pedal to fall away from the driver.

Figure 2:
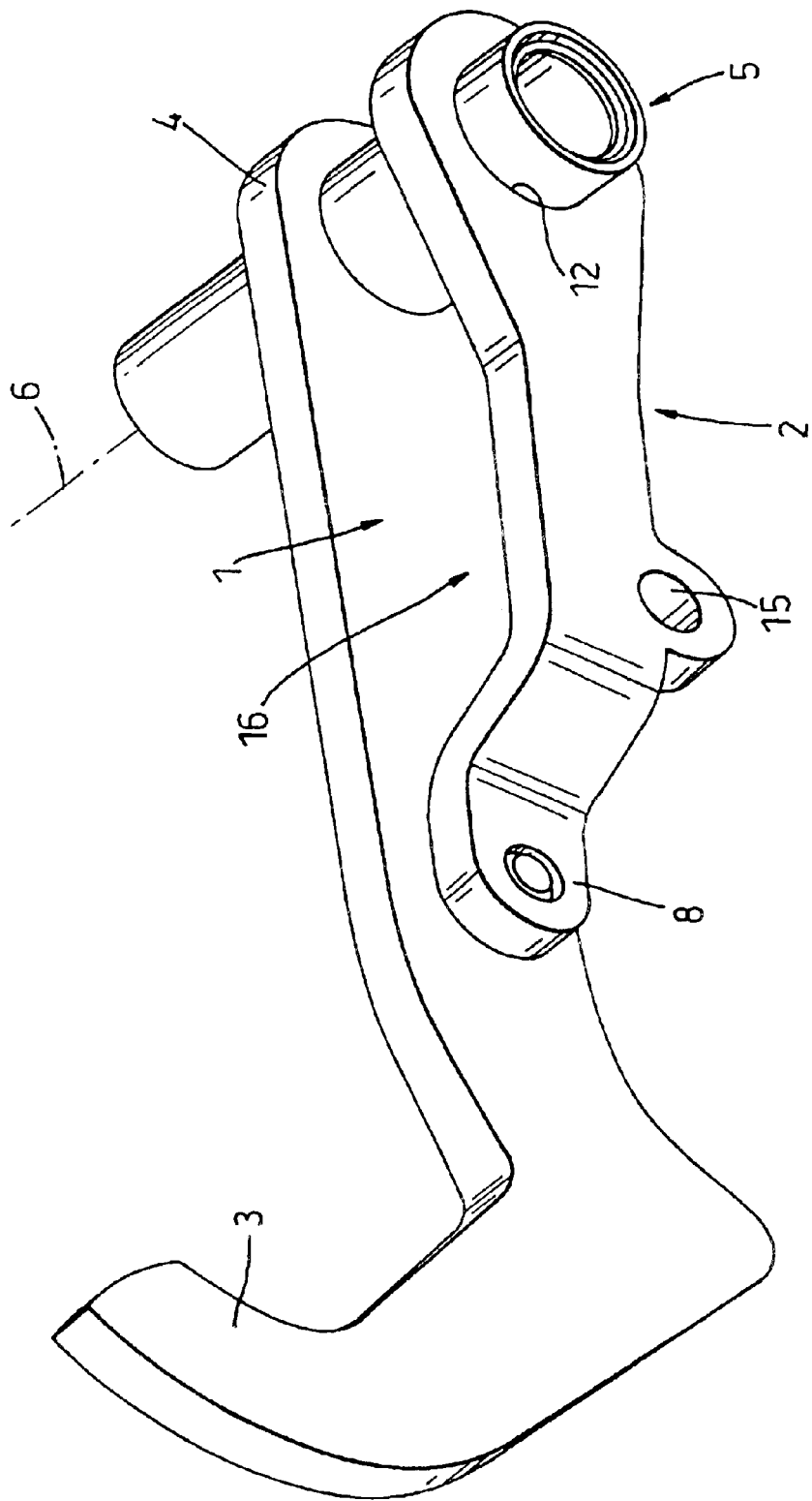
FIG. 2 is a perspective view of the second embodiment.

In FIG. 2, during normal operation, component 8 takes the form of a pin, and the interaction of the pin and the second blade part 2 maintains pedal position and loading.

During a frontal crash situation of sufficient magnitude, a separate part (not shown), which is preferably located on the conventionally-provided cross car beam, is forced into a gap 16 between the first blade part 1 and the second blade part 2, providing a separation force between the first and second blade parts 1 and 2 and forcing the second blade part 2 over the pin 8, allowing the pedal to fall away from the driver.

Figure 3A:
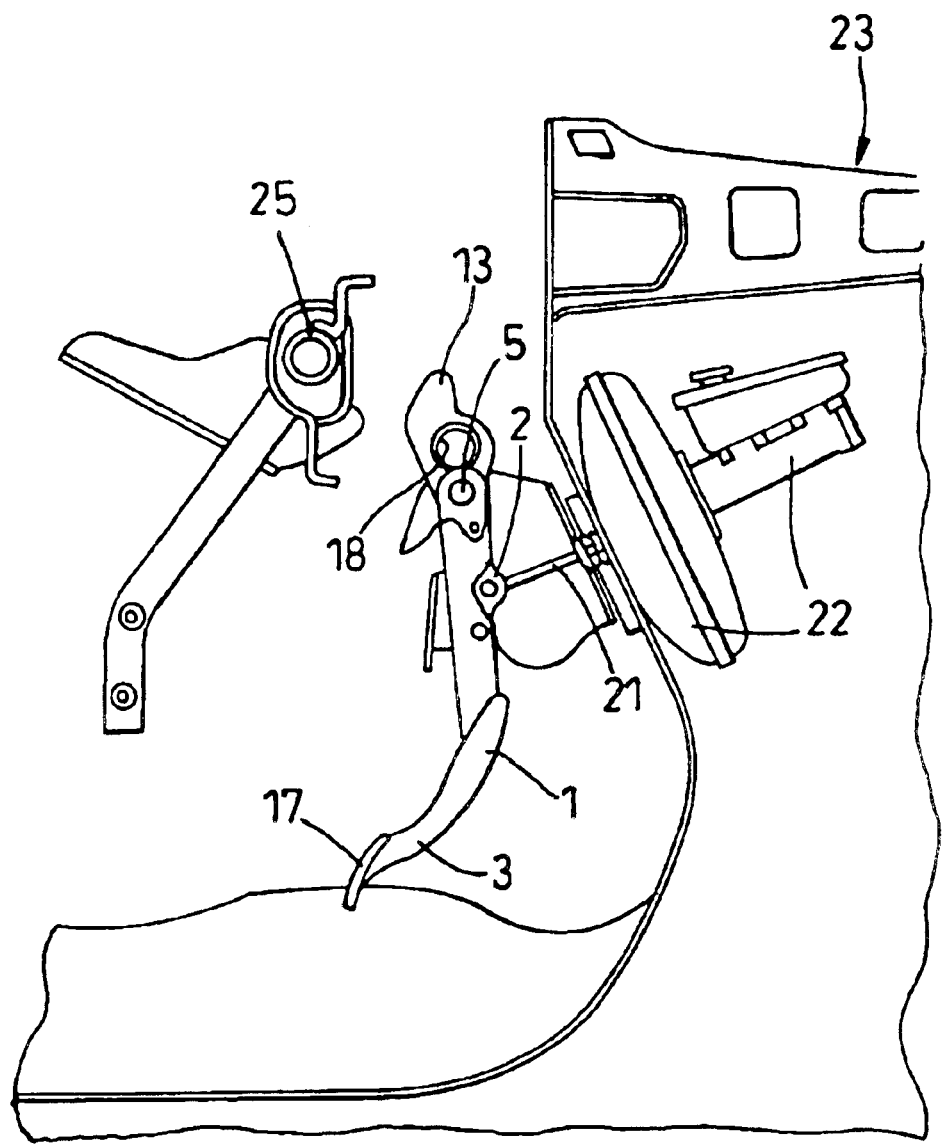
FIGS. 3A and 3B are side elevations of a third embodiment of pedal installed in a motor vehicle in pre and post crash situations.
Figure 3B:
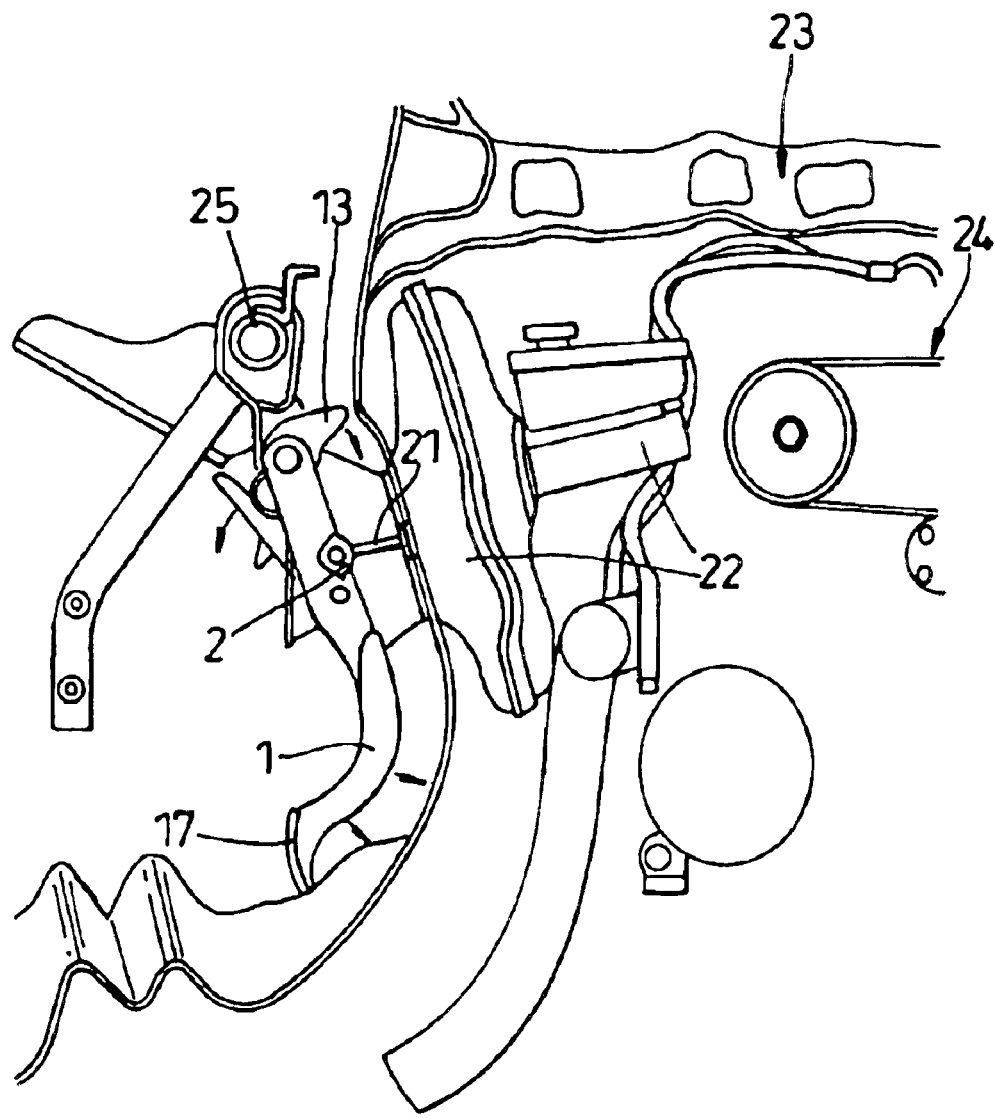
Figure 4A:
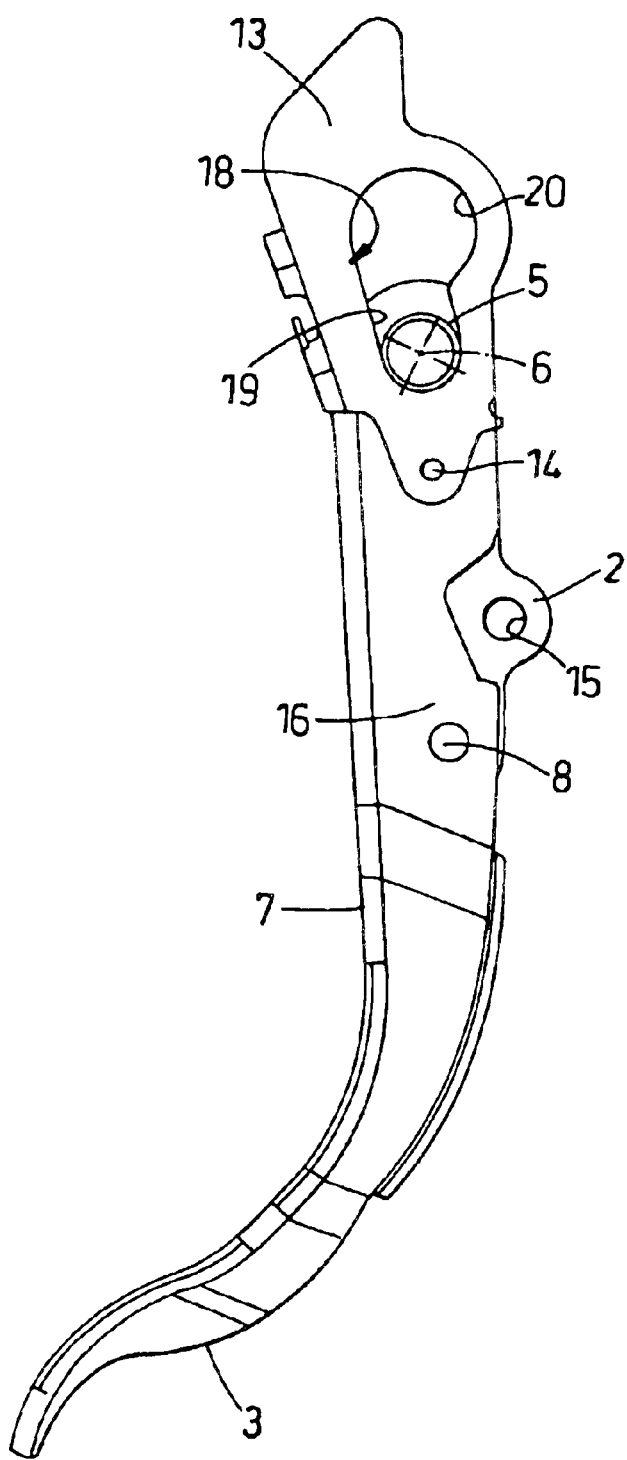
FIGS. 4A, 4B and 4C detail the pedal of FIGS. 3A and 3B in normal operation condition, part de-latched during a crash situation, and fully de-latched after a crash situation.
Figure 4B:
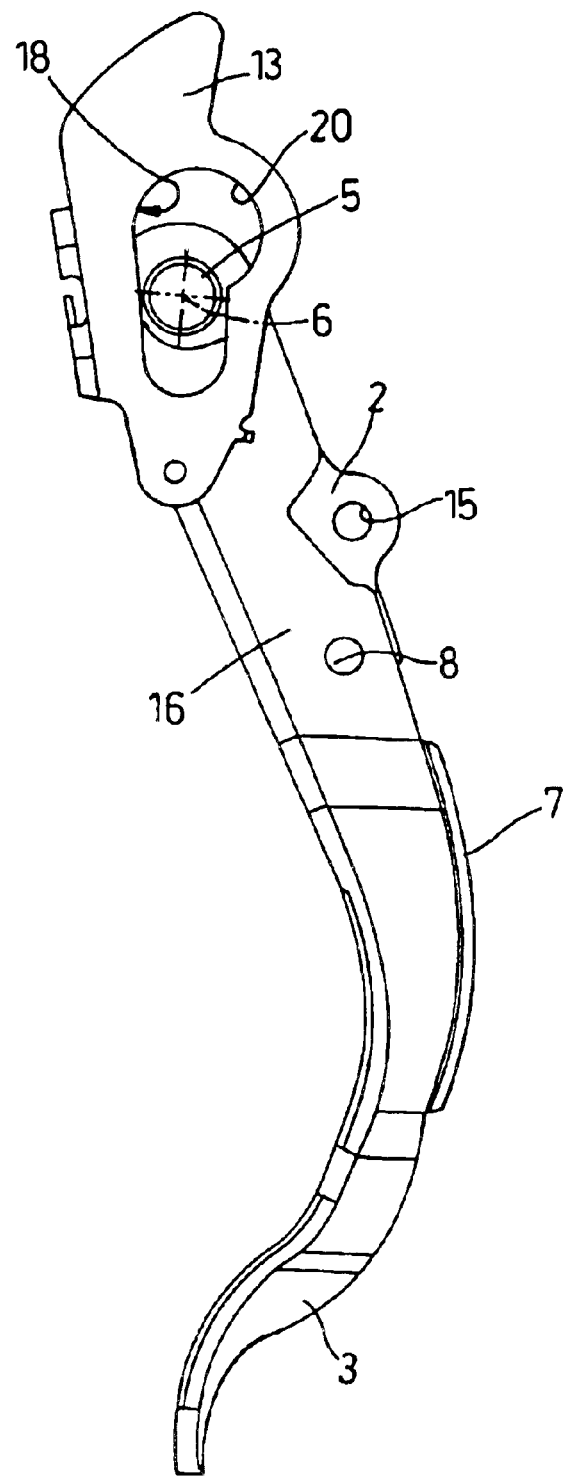
Figure 4C:
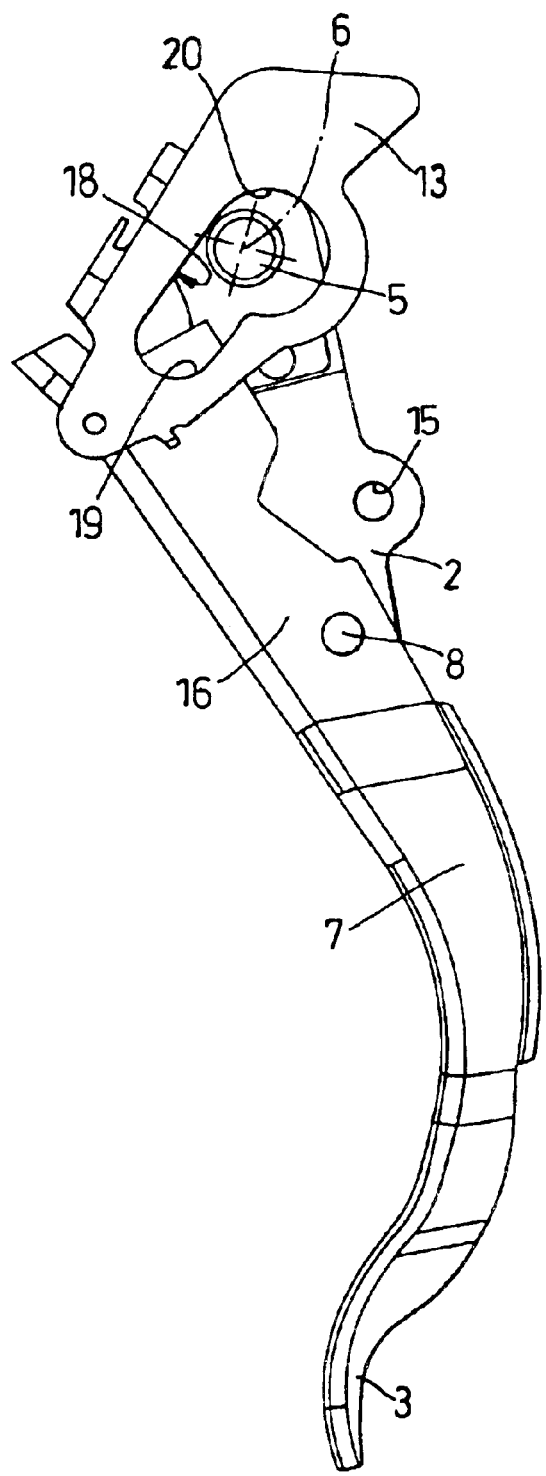

In the embodiment of FIGS. 3A, 3B, 4A, 4B and 4C, the first blade part 1 is of "U" section having spaced-apart side cheeks 16 between which is housed the second blade part 2 in the normal operation position, as illustrated in FIGS. 3A and 4A, whilst release lever 13 is secured to the first blade part 1 by the rivet 14 and, in the normal operation condition serves to latch together the first and second blade parts 1 and 2. The first blade part 1 is provided at one end with a foot pad 17, and intermediate its ends is attached to the second blade part 2 by the rivet 8. The release lever 13 is provided with a slot 18 having a narrow throat portion 19 (which engages the hub 5 in the normal, stable, braking position) extending into an enlarged portion 20 in which the hub 5 is located in the unstable, de-latched position of FIG. 3B and FIG. 4C.

As shown in FIGS. 3A and 3B, hole 15 provides for a pivotal connection to a push rod 21 of a brake booster 22 located within engine/transmission compartment 23, the engine/transmission package being indicated at 24 in FIG. 3B, and the compartment 23 being designed to deform in a frontal crash situation of sufficient magnitude. Also illustrated in FIGS. 3A and 3B is a conventionally provided cross-beam 25 that is designed for minimal deformation in a frontal crash situation of sufficient magnitude.

Comparing the positions of the various components of FIGS. 3A and 3B, it will be seen that, in a frontal crash situation of sufficient magnitude, the compartment 23 deforms, and is displaced, rearwardly towards the cross-beam 25. Eventually, and as illustrated in FIG. 3A, the lever 13 strikes the cross-beam 25, and is rotated clockwise about its rivet 14, until hub 5 enters the enlarged slot portion 20 and the first blade part 1 becomes de-latched from the second blade part 2 by rotating in an anti-clockwise direction.

What is claimed is:

1. A motor vehicle incorporating at least one pedal comprising a two part blade, characterized in that a first blade part (1) is adapted at one end (3) to carry a foot pad (17), and a second blade part (2) having a connection (8,9,10) to said first blade part (1) and adapted to be pivotally connected to one end of a push rod (21) of an operating mechanism of either a brake booster (22) or a clutch, with a release lever (13) to disconnect said connection (8,9,10) between said first and second blade parts (1,2) and said push rod (21) in a frontal crash situation of sufficient magnitude, and thereby to render ineffective, said pivotal connection of said push rod (21) to said second blade part (2) and hence to said pedal; said release lever (13) being pivotally attached to one of said blade parts (1,2), said release lever (13) comprising a slot (18) having a narrow throat portion (19) extending to an enlarged portion (20) and said release lever (13) adapted, in a frontal crash situation of sufficient magnitude, to abut a portion (25) of the vehicle designed for minimal deformation, and thereby be rotated to a release position.

2. A motor vehicle brake or clutch pedal comprising a two part blade, characterized in that a first blade part (1) is adapted at one end (3) to carry a foot pad (17), and a second blade part (2) having a connection (8,9,10) to said first blade part (1) and adapted to be pivotally connected to one end of a push rod (21) of an operating mechanism of either a brake booster (22) or a clutch, with a release lever (13) to disconnect said connection (8,9,10) between said first and second blade parts (1,2) and said push rod (21) in a frontal crash situation of sufficient magnitude, and thereby to render ineffective, said pivotal connection of said push rod (21) to said second blade part (2) and hence to said pedal; said release lever (13) being pivotally attached to one of said blade parts (1,2), said release lever (13) comprising a slot (18) having a narrow throat portion (19) extending to an enlarged portion (20) and said release lever (13) adapted, in a frontal crash situation of sufficient magnitude, to abut a portion (25) of the vehicle designed for minimal deformation, and thereby be rotated to a release position.

3. A pedal as claimed in claim 2, characterized in that said first blade part (1) is latched to said second blade part (2) for normal operation, being unlatched upon rotation of said release lever (13) to said release position.

4. A pedal as claimed in claim 2, characterized in that said first blade part is of "U" section having spaced-apart side cheeks (16) between which is housed said second blade part (2), the two blade parts (1,2) being attached to one another by a pin or rivet.

* * * * *